(12) United States Patent
Crossland et al.

(10) Patent No.: US 6,954,252 B1
(45) Date of Patent: Oct. 11, 2005

(54) OPTICAL SWITCH INCLUDING TWO INTEGRATED MULTIPHASE SLM'S AND A WAVE-PLATE THE WAVE-PLATE PROVIDING AN OPTICAL RETARDANCE OF $(2N+1)\lambda/4$

(75) Inventors: William Crossland, Harlow (GB); Melanie Holmes, Woodbridge (GB); Ilias Manolis, Olympia Hleias (GR); Timothy Wilkinson, Jesus College (GB); Maura Redmond, Girton (GB); Brian Robertson, Hove (GB)

(73) Assignee: Thomas Swan & Co. LTD, County Durham (GB)

( * ) Notice: Subject to any disclaimer, the term of this patent is extended or adjusted under 35 U.S.C. 154(b) by 31 days.

(21) Appl. No.: 10/089,929

(22) PCT Filed: Oct. 4, 2000

(86) PCT No.: PCT/GB00/03796

§ 371 (c)(1),
(2), (4) Date: Apr. 3, 2002

(87) PCT Pub. No.: WO01/25840

PCT Pub. Date: Apr. 12, 2001

(30) Foreign Application Priority Data

Oct. 4, 1999 (GB) .................................. 9923428

(51) Int. Cl.⁷ ................................................ G02F 1/13
(52) U.S. Cl. ...................... 349/196; 349/193; 349/197; 349/201; 359/237

(58) Field of Search .................. 349/193, 196, 349/197, 201; 359/10, 245, 237, 279, 295, 359/316

(56) References Cited

U.S. PATENT DOCUMENTS

| | | | | |
|---|---|---|---|---|
| 5,155,778 | A | * 10/1992 | Magel et al. | 385/18 |
| 5,159,473 | A | 10/1992 | Feldman | 359/1 |
| 5,373,393 | A | * 12/1994 | DeJule et al. | 359/320 |
| 5,627,666 | A | * 5/1997 | Sharp et al. | 349/74 |
| 5,930,012 | A | 7/1999 | Mears et al. | 359/15 |
| 6,141,069 | A | * 10/2000 | Sharp et al. | 349/98 |
| 6,172,777 | B1 | * 1/2001 | Flood et al. | 359/10 |
| 6,373,549 | B1 | * 4/2002 | Tombling et al. | 349/201 |

FOREIGN PATENT DOCUMENTS

EP 0878729 11/1998 ......... G02F 1/1335

OTHER PUBLICATIONS

Love, Gordon D, Liquid-crystal Phase Modulator for Unpolarized Light, Applied Optics, vol. 32, pp. 2222-2223, May 1, 1993.

* cited by examiner

Primary Examiner—Tarifur R. Chowdhury
(74) Attorney, Agent, or Firm—Allston L. Jones (57) ABSTRACT

An optical switch uses a polarization insensitive spatial light modulator operating by a double pass through a liquid crystal cell. The switch includes two such modulators in a cross bar arrangement. Different embodiments employing techniques for reducing cross talk are described.

5 Claims, 7 Drawing Sheets

OPTICAL SWITCH INCLUDING TWO INTEGRATED MULTIPHASE SLM'S AND A WAVE-PLATE THE WAVE-PLATE PROVIDING AN OPTICAL RETARDANCE OF (2N+1)λ/4

CROSS REFERENCE

This application is a PCT National Phase Application the claims priority from PCT/GB00/03796 having an International filing date of 4 Oct. 2000 which in turn claims priority from UK patent application 9923428.8 filed 4 Oct. 1999.

FIELD OF THE INVENTION

The invention relates to the general field of optical switching and more particularly to optical switching using multiphase or continuous phase hologram devices.

BACKGROUND OF THE INVENTION

Optical fibre switching components are fundamental to modern global information systems. Single-stage matrix switches operating independently of the optical bit-rate and modulation formats, capable of reconfigurably interconnecting N optical inputs to M optical outputs (where N and M are generally, but not necessarily the same number), are particularly attractive. Many switches for achieving the required switching are limited in functional size to less than 64×64, and/or suffer from relatively poor noise performance. One method which provides good noise performance and is potentially more scalable than other optical switch technologies is to use reconfigurable holograms as elements for deflecting optical beams between arrays of optical inputs and optical outputs.

Figure 1:
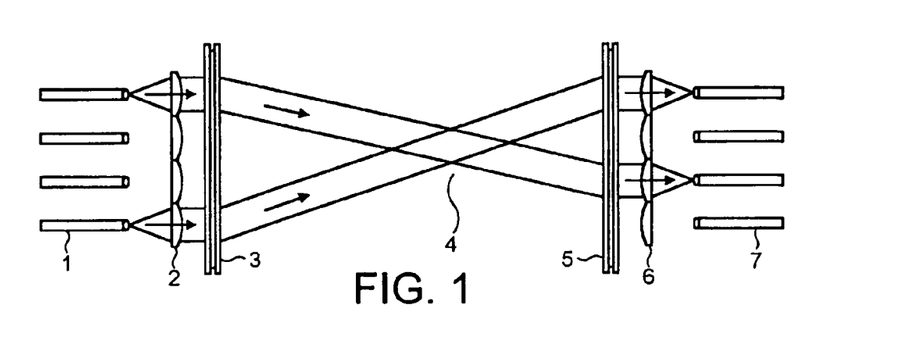
FIG. 1 shows a prior art optical switch useful in understanding the present invention.

A known holographic optical switch, otherwise known as an optical shuffle, is shown in FIG. 1.

In FIG. 1, an array of optical sources 1 and an array of optical receivers 7 are arranged as the inputs and outputs of a holographic switch. For many applications, the sources and receivers may comprise cleaved or end-polished fibres. In other applications, the inputs may be light emitting sources such as lasers or LEDs, and the outputs may be photo-detectors. Each input 1 may transmit a different digital or analog optical signal through the switch to one (or possibly several) of the outputs 7. Thus up to N different inputs may be simultaneously passing through the switch at any instant. Each input may consist of a single-wavelength modulated by data; a number of different data sources operating at different wavelengths (e.g. a wavelength-multiplexed system); or a continuum of wavelengths. Although the switch is shown in cross-section in FIG. 1, the input & output arrays 1, 7 are typically 2-dimensional arrays, and the holographic switch occupies a 3-dimensional volume.

To achieve switching, the input array 1 is arranged behind a first lens array 2. Each optical signal emitted by the input array enters free-space, where it is collimated by one of the lenses in first lens array 2. Each collimated beam then passes through a first hologram display device 3. The first hologram display device 3 displays a holographic pattern of phase and/or intensity and/or birefringence which has been designed to produce a specific deflection of the optical propagation directions of the beams incident upon the device. The hologram pattern may also be designed such that each optical beam experiences a different angle of deflection. The first hologram display device 3 may also have the effect of splitting an individual beam into several different angles or diffraction orders. One application for utilising this power splitting effect is to route an input port to more than one output port.

The deflected optical signals propagate in free-space across an interconnect region 4 until they reach a second hologram device 5. The hologram pattern at second hologram device 5 is designed in such a way to reverse the deflections introduced at the first hologram display device 3 so that the emerging signal beams are parallel with the system optic axis again.

The optical signals then pass through a second lens array 6 where each lens focuses its associated optical signal into the output ports of a receiver array 7. Thus the hologram pattern displayed on first hologram display device 3 and the associated "inverse" hologram pattern displayed on second hologram display device 5 determine which output fibre or fibres 7 receive optical data from which input fibre or fibres 1. The interconnect region 4 allows the signal beams to spatially reorder in a manner determined by the specific hologram patterns displayed on the first 3 and second 5 hologram display devices. The switch also operates reversibly such that outputs 7 may transmit optical signals back to the inputs 1.

The system shown in FIG. 1 (and functionally equivalent configurations utilising planes of symmetry within the switch optics) is well known as a method for static optical shuffle, using fixed hologram recordings as first 3 and second 5 hologram display devices whereby the input signals are "hard-wired" to specific outputs.

It has been proposed to extend the optical shuffle of FIG. 1 to provide a reconfigurable switch by displaying hologram patterns on a spatial light modulator (SLM). There are however a number of practical design problems associated with the migration from a static optical shuffle to a reconfigurable switch. Among these are the following:

1) Known SLMs, using a ferroelectric liquid crystal provide binary phase modulation and such phase modulation can be
2) polarisation-insensitive. However, the maximum theoretical diffraction efficiency for a binary phase device is only 40.5%. For example, the architecture shown in FIG. 1 uses two SLM devices, and hence the maximum net diffraction efficiency of this system is 16.4%. The diffraction efficiency of holographic system would be improved significantly by using multiple phase modulation. For many applications this multiple phase modulation must be polarisation-insensitive. It is desirable that the phase may be varied continuously between 0 and (at least) $2\pi$.
3) In order to implement a holographic switch using two SLMs, an appropriate set of hologram patterns must be chosen. This hologram set must be capable of routing any input channel to any input channel whilst keeping the crosstalk figures within specified values. In particular, the hologram set must be optimised to prevent beams associated with unwanted diffraction orders from being launched down the wrong channel. Increasing the number of phase levels tends to result in a decrease in the strength of the unwanted diffraction orders.
4) A convenient method of constructing reconfigurable holograms for use within an N×N switch would be to integrate a layer of liquid crystal material above a silicon circuit. This type of SLM typically operates in reflection rather than transmission, and the switch layout shown in FIG. 1 is therefore no longer appropriate.

Accordingly the present invention aims to address at least some of these issues.

SUMMARY OF THE INVENTION

According to a first aspect of the invention there is provided a switch comprising an integrated spatial light modulator for receiving light of a predetermined wavelength, the modulator comprising a liquid crystal layer spaced from a second layer by a layer having an optical retardance of an odd integer number of quarter-waves of said wavelength, wherein the second layer is reflective of said light of said wavelength.

In one embodiment said liquid crystal layer is a nematic crystal layer.

In another said liquid crystal layer is a π-cell.

Preferably the second layer is a metallic layer.

Advantageously the metallic layer is of Aluminium.

Conveniently said wavelength is 1.57 μm.

According to a second aspect of the invention there is provided a switch comprising an integrated spatial light modulator for receiving light of a predetermined wavelength, the modulator comprising a liquid crystal cell having a pair of opposed and mutually substantially parallel end plates disposed substantially parallel to an axial plane, and spaced apart by a liquid crystal layer providing a director angle tilt in a tilt plane substantially orthogonal to said axial plane, said liquid crystal being spaced from a second layer by an optical layer having a retardance of an odd integer number of quarter-waves of said wavelength, wherein the second layer is reflective of said light of said wavelength, and the optical layer being disposed with respect to said tilt plane such that light polarised in said tilt plane returns through said liquid crystal layer polarised substantially orthogonal to said tilt plane.

Preferably said liquid crystal layer is a nematic crystal layer.

Alternatively said liquid crystal layer is a π-cell.

Preferably the second layer is a metallic layer.

Conveniently the metallic layer is of Aluminium.

Advantageously the modulator has a glass cover disposed over said liquid crystal layer, and the metallic layer has a connection to driving circuitry for switching the modulator.

According to another aspect of the invention there is provided a method of switching a light beam having a first component polarised in a first direction and a second component polarised in a second direction orthogonal to the first, the method comprising providing a device having a liquid crystal layer and an optical retardance, the liquid crystal being responsive to a variable drive voltage to provide a corresponding variation in director angle tilt; and further comprising: applying a variable drive voltage to said liquid crystal device; applying said beam to said liquid crystal device to provide an intermediate beam having a variable phase delay applied to said first component and an at least substantially fixed phase delay to said second component; by said retardance, rotating the polarisation of said intermediate beam; applying the resultant light to said liquid crystal device whereby a component of said resultant light polarised in said first direction receives said variable phase delay and a component of said resultant light polarised in said second direction receives said at least substantially fixed phase delay.

Preferably the rotating step comprises rotating said polarisation through 90 degrees whereby at least substantially equal amounts of variable phase delay are applied to each of said first and second components.

Advantageously the rotating step comprises a step of reflecting said intermediate beam back along its incoming path.

According to yet another aspect of the invention there is provided an optical switch comprising a plurality of input optical fibres for providing plural input light beams, a plurality of optical receivers for receiving output light beams, a first and a second reflective spatial light modulator, and drive circuitry for forming a respective plurality of switching holograms on each spatial light modulator, said holograms being selected to couple each said input optical source to a respective desired optical receiver, wherein each spatial light modulator incorporates a liquid crystal device for modulating the phase of light travelling through said liquid crystal device, a reflector device for returning light back through said liquid crystal device and a device, disposed between said liquid crystal device and said reflector device, for rotating the polarisation of light by 90 degrees, wherein the optical switch has an axis of symmetry and the spatial light modulators are disposed on opposite sides of said axis, each said switching hologram on said first spatial light modulator being operative to deflect said input light beams to said switching holograms on said second spatial light modulator and each said switching hologram on said second spatial light modulator being operative to deflect said light beams to a respective optical receiver.

Preferably each said input optical fibre is directed towards a respective switching hologram on said first spatial light modulator, and each said optical receiver comprises an output optical fibre, wherein each output optical fibre is directed towards a respective switching hologram on said second spatial light modulator.

In one embodiment the first and second spatial light modulators are disposed such that a respective zero-order beam reflected from each switching hologram on said first spatial light modulator is incident on a respective switching hologram on said second spatial light modulator.

Preferably a half wave plate is disposed between said first and second spatial light modulators.

Alternatively the switching holograms are spaced apart on said first and second spatial light modulators and the first and second spatial light modulators are disposed such that a respective zero-order beam reflected from each switching hologram on said first spatial light modulator is incident on a spacing between two adjacent switching holograms on said second spatial light modulator.

Advantageously a half wave plate is disposed between said first and second spatial light modulators.

Conveniently the switch further comprises respective optical systems disposed between said input fibres and said first spatial light modulator and between said output fibres and said second spatial light modulator, wherein each said optical system comprises two confocal lenses, the input and output fibres being disposed in respective planes and a focal plane of a first lens of each optical system coinciding with the plane of the associated fibres.

Preferably the input and output fibres are disposed in respective planes and the optical switch further comprises respective arrays of microlenses, said microlenses being disposed in front of each fibre plane such that each microlens corresponds to a respective fibre, and respective optical systems disposed between said input fibres and said first spatial light modulator and between said output fibres and said second spatial light modulator, wherein each said optical system comprises two confocal lenses, and a focal plane of a first lens of each optical system coinciding with the output focal plane of the associated microlens array.

Advantageously said optical fibres are thermally expanded core (TEC) fibres.

In another embodiment the first and second spatial light modulators are mutually offset so that no zero order beams from the first spatial light modulator is incident on the second spatial light modulator.

Conveniently at least one optical receiving element is disposed in a region receiving said zero-order beams from said first spatial light modulator, whereby input signal may be monitored.

Advantageously, the or each element is a fibre. Alternatively other elements such as receiver diodes could be used.

Preferably each switching hologram provides a repeating pattern on its spatial light modulator, whereby the repeating patterns on the two SLMs satisfy the relation:

$$\theta_2(u)=\theta_1(-u)$$

where $\theta_2$ (u) is the repeating pattern on the second SLM and $\theta_1(-u)$ is the repeating pattern on the first SLM, and the angle of incidence is such that the Poynting vector of the input light beam incident on the first SLM, and of the light beams leaving the second SLM, is in the plane of tilt of the director.

In a preferred embodiment, the output fibres are secured together in an array by a glue containing black pigment to attenuate misaligned light.

In another preferred embodiment, the output fibres are secured together to form an array and the spacing between the fibres of the array is occupied by interstitial fibres which serve to accept and guide away cross talk from the switching zone.

BRIEF DESCRIPTION OF THE DRAWINGS

Non-limiting embodiments of the invention will now be described with reference to the accompanying drawings, in which.

DESCRIPTION OF THE PREFERRED EMBODIMENTS

In the various figures, like reference signs indicate like parts.

Figure 2:
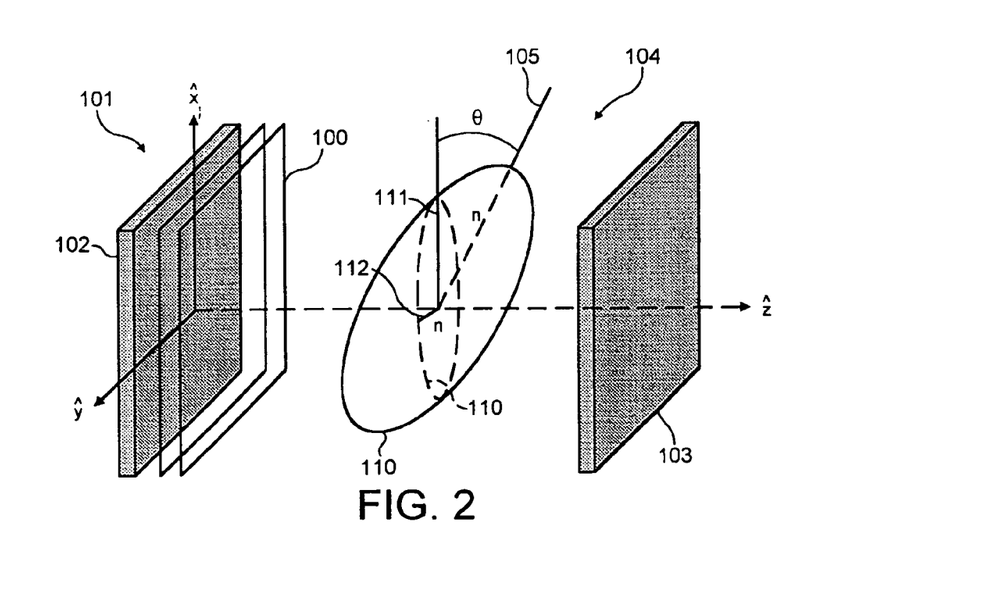
FIG. 2 is a schematic diagram showing the propagation of a planar wave front through a uniaxial liquid crystal device.

FIG. 2 shows the propagation of a planar wave front 100, travelling along the z-direction through a layer of uniaxial liquid crystal cell 101 of uniform alignment. The cell comprises a front plate 102 and a rear plate 103 sandwiching the liquid crystal 104. The optical axis 105, later also referred to herein as a director axis of the uniaxial medium has been taken in the general case to tilt away from the x-direction by an angle θ on to the plane xOz. The tilt angle θ is electrically controllable by a voltage applied across the liquid crystal cell 101. The two propagation modes travel along the z-direction with different velocities: these may be calculated using a geometric construction in which an ellipsoid is drawn with a long axis of length $n_e$ parallel to the director. For a uniaxial medium the other two axes of the ellipsoid have equal lengths ($n_0$). A plane is constructed perpendicular to the Poynting vector (in this case the plane is parallel to the xOy plane). The intersection of this plane with the ellipsoid defines an ellipse 110. The directions of the major and minor axes 111, 112 of this ellipse define the two orthogonal polarisation modes, while the lengths of these two axes define the refractive index experienced by the corresponding mode. For a tilt in the xOz plane, the minor axis of this ellipse is parallel to the y direction, and the major axis is therefore parallel to the x direction, for all values of θ. Hence, for any θ, the x and y directions are parallel to the polarisation modes, so that the components of incident light polarised in these directions will remain in these directions on propagation through the liquid crystal. This remains true even if the tilt angle θ is changing inside the medium.

The length of the minor axis 112 is $n_0$, for all values of θ. Hence the component of the field that is parallel to the y-axis experiences refractive index $n_O$ whatever the tilt angle θ is, and therefore the phase delay caused to it by the cell is independent of the voltage across it (ordinary wave). On the contrary, the length of the major axis does depend on the tilt angle θ, and so the x-component of the field (extraordinary wave) experiences different refractive index n for different values of the tilt angle.

The length of the major axis 111 is n(θ), and is given by equation (1):

$$\frac{1}{n^2(\theta)} = \frac{\cos^2(\theta)}{n_o^2} + \frac{\sin^2(\theta)}{n_e^2} \quad (1)$$

It follows that $n_o \leq n(\theta) \leq n_e$. The relative phase delay between the two components is then given by the equation (2):

$$\Delta\phi = k_0 d\Delta n \quad (2)$$

In equation (2), d is the thickness of the liquid crystal cell, $k_0$ the wavenumber of the field in free space and $\Delta n$ is given by $\Delta n = n(\theta) - n_o$. Since $\Delta n$ is a function of the voltage across the cell, equation (2) shows that the applied voltage can continuously control the phase difference between the two components across the cell.

It will be understood by those skilled in the art that it is desirable to provide phase modulation that is not sensitive to polarisation, and devices and methods for achieving this will now be described for the situation of normally incident light:

Expression (3) shows a mathematical representation of an arbitrary polarisation state as the superposition of two orthogonal, linearly polarised waves:

$$E_{IN}(x, y, z, t) = \begin{pmatrix} E_{0X}(t)\exp j\varepsilon_x(t) \\ E_{0Y}(t)\exp j\varepsilon_Y(t) \end{pmatrix} \exp j(kz - \omega t) \quad (3)$$

where the amplitudes, $E_{0Y}(t)$ and $E_{0X}(t)$, and phases $\varepsilon_x(t)$ and $\varepsilon_y(t)$ vary slowly, remaining essentially constant over a large number of oscillations. For unpolarised light the relative amplitude, $E_{0Y}(t)/E_{0X}(t)$ and relative phase, $\varepsilon_y(t)-\varepsilon_x(t)$, vary rapidly compared to the coherence time of each linearly polarised component, i.e. the two waves are mutually incoherent. For randomly polarised light the relative amplitude and phases vary slowly with respect to the coherence time, i.e. the two waves are mutually coherent. Hence the above representation is valid for any light wave.

Such light could be modulated by applying the same phase delay to both of these components. However, the configuration in FIG. 2, allows just one of the two components x-component) to be properly phase-modulated since the y-component always gains the same phase delay.

Figure 3:
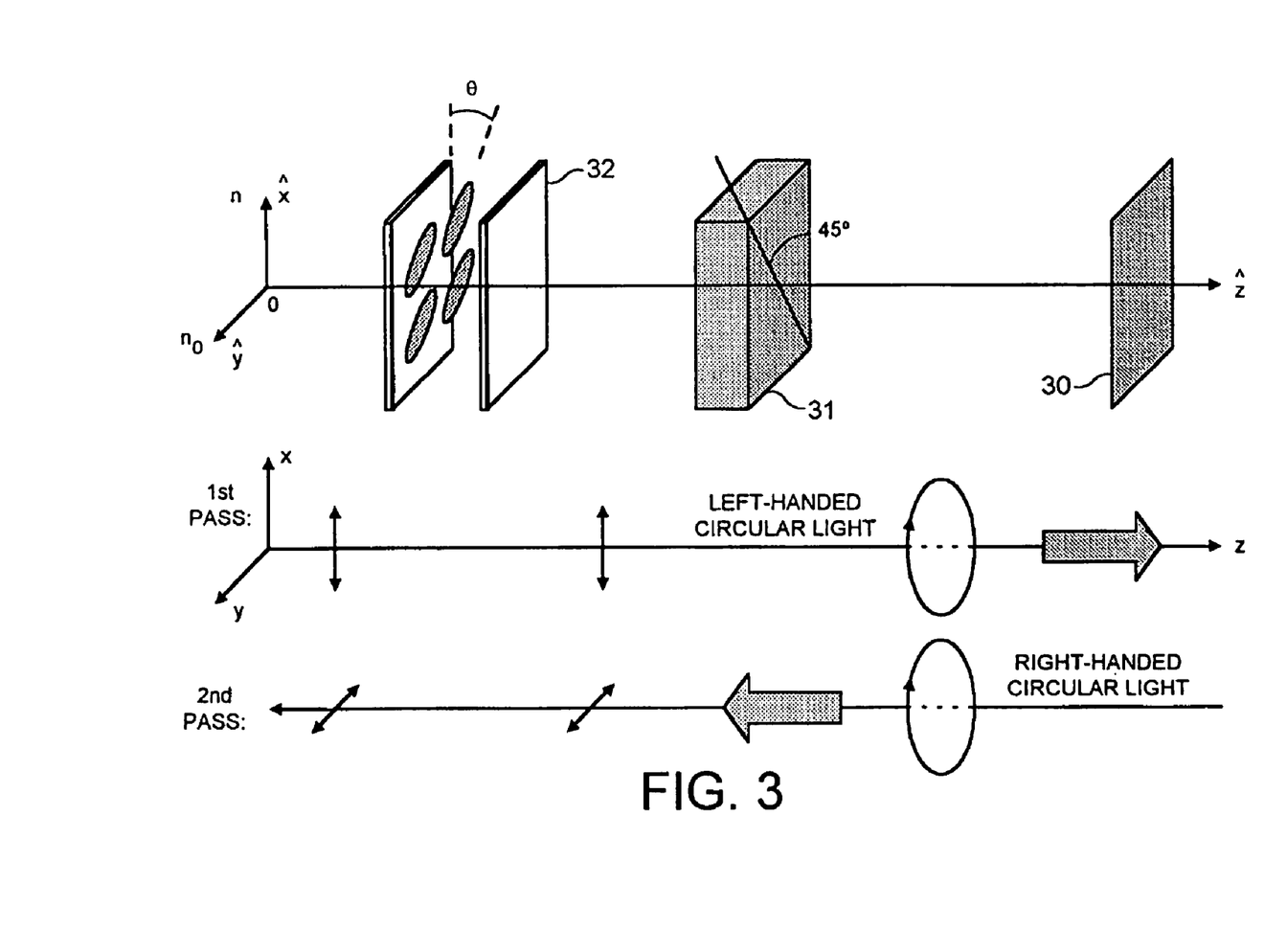
FIG. 3 shows the use of a quarter-wave plate, and illustrates the polarisation states of an input field in a double-pass reflective system.

FIG. 3 shows a schematic diagram of a configuration that would allow for both components to be modulated. Referring to FIG. 3, light is reflected from a mirror 30 after passing through a liquid crystal cell 32 to enable a double-pass configuration. In between the two passes a suitable rotator 31 is introduced, which rotates both components through 90°. As is known to those skilled in the art, a quarter-wave plate acts to retard one polarisation component of light relative to the orthogonally polarised component; thus the combination of a quarter-wave plate (with an optical axis tilted out of the plane 0xz by 45°) and a mirror acts as a 90° rotator. It would of course be possible to use a 3/4, 5/4 etc-wave plate, the criterion being an odd-integer number of quarter waves, so that a double pass produces the overall 90° rotation. Consider light with an arbitrary polarisation state (as in expression 3) at normal incidence passing through the configuration shown in FIG. 3. Differences for off-normal incidence will be considered later.

For the first pass, on the way towards the quarter wave plate and mirror, the polarisation component polarised in the x direction ($E_{0X}(t) \exp j\,\varepsilon_x(t)$) experiences a refractive index $n(\theta)$, where $\theta$ depends on the applied voltage, while the component in the y direction ($E_{0Y}(t) \exp j\,\varepsilon_y(t)$) does not, and instead experiences a refractive index, $n_0$, that is independent of the applied voltage. The orientation of the quarter wave plate is such that these two polarisation components are exchanged. For the $2^{nd}$ pass, on returning back through the liquid crystal, the component $E_{0X}(t) \exp j\,\varepsilon_x(t))$ is now polarised in the y direction, and therefore experiences a refractive index $n_0$, while the component $E_{0Y}(t) \exp j\,\varepsilon_y(t)$ is now polarised in the x direction, and experiences a refractive index $n(\theta)$. In this way both components gain overall the same amount of phase delay through the system since they both experience one pass under a refractive index $n(\theta)$ and one pass under a refractive index $n_o$.

In particular (equations 4 and 5):

$E_{0X}$ component: $\Delta\phi_{OX} = \Delta\phi_{1ST\text{-}PASS} + \Delta\phi_{2ND\text{-}PASS} = kn(\theta)d + kn_0 d$ \quad (4)

$E_{0Y}$ component: $\Delta\phi_{OY} = \Delta\phi_{1ST\text{-}PASS} + \Delta\phi_{2ND\text{-}PASS} = kn_0 d + kn(\theta)d$ \quad (5)

The system may be described mathematically (equation 6) in terms of Jones matrices, with the result that (as expected):

$$E_{OUT}(x,y,z,t) = \begin{pmatrix} 0 & \exp jkd(n_0 + n(\theta)) \\ \exp jkd(n_0 + n(\theta)) & 0 \end{pmatrix} \begin{pmatrix} E_{0X}(t)\exp j\varepsilon_x(t) \\ E_{0Y}(t)\exp j\varepsilon_Y(t) \end{pmatrix} \exp j(kz-\omega t) \quad (6)$$

$$= \begin{pmatrix} E_{0Y}(t)\exp j\{\varepsilon_Y(t) + kd(n_0 + n(\theta))\} \\ E_{0X}(t)\exp j\{\varepsilon(t) + kd(n_0 + n(\theta))\} \end{pmatrix} \exp j(kz - \omega t)$$

It should however be noted that the light exits the system in the opposite orthogonal state. This Jones matrix result uses the convention that the y-axis is inverted on reflection from the mirror. The mathematical result confirms that both components of the output light have the same phase change (in agreement with equation 4 and 5) and therefore polarisation insensitive phase modulation is feasible.

In general $\theta$ may vary with z, in which case the index $n(\theta)$ in (6) should be replaced by (expression 7):

$$n(\theta) \rightarrow \frac{1}{d} \int_{z=0}^{d} n(\theta(z))dz \quad (7)$$

The foregoing principle can be applied to an array of modulating elements. A plane wave front of arbitrarily polarised light, which normally impinges on to such an array of pixels, each of which is characterised by a specific value of tilt angle (by the application of different voltages across it), or a specific distribution of tilt angles, can be spatially phase modulated.

Figure 4:
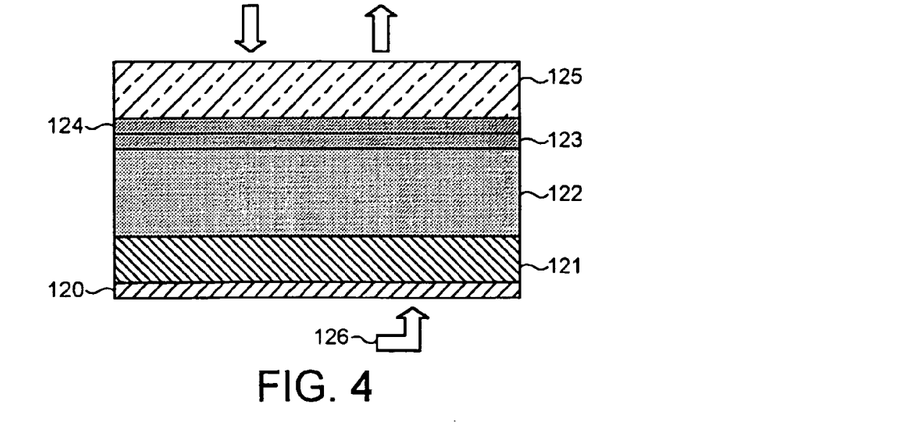
FIG. 4 shows a schematic cross-sectional view of a first embodiment of a SLM with integral quarter-wave plate.

Referring now to FIG. 4, a first embodiment of an integrated spatial light modulator in accordance with the invention will now be described:

AS seen in FIG. 4, the SLM consists of an aluminium pad 120, which forms a pixel array, and is connected to pixel driving circuitry by a connection figuratively shown at 126. On the pixel array 120 there is disposed a quarter-wave plate 121. On the quarter-wave plate, and over an intervening alignment layer, (not shown) there is disposed a liquid crystal layer 122—here a nematic liquid crystal is used, but the invention is not so limited. The actual requirement is the ability to provide an out of plane tilt. On the liquid crystal layer there is disposed an alignment layer 123, as known to those skilled in the art, and over the alignment layer there is disposed a transparent conductive layer 124 such as an ITO (Indium Tin Oxide) layer forming a common electrode plane, and an upper glass layer 125.

The quarter-wave plate can be deposited on the pixel array by spin-coating a proper reactive monomer, which can be polymerised by exposure to ultraviolet light. In the cell of FIG. 4, the aluminium pad acts as a mirror and also provides the necessary power voltage across the cell for the liquid crystal 122 to switch.

Figure 5:
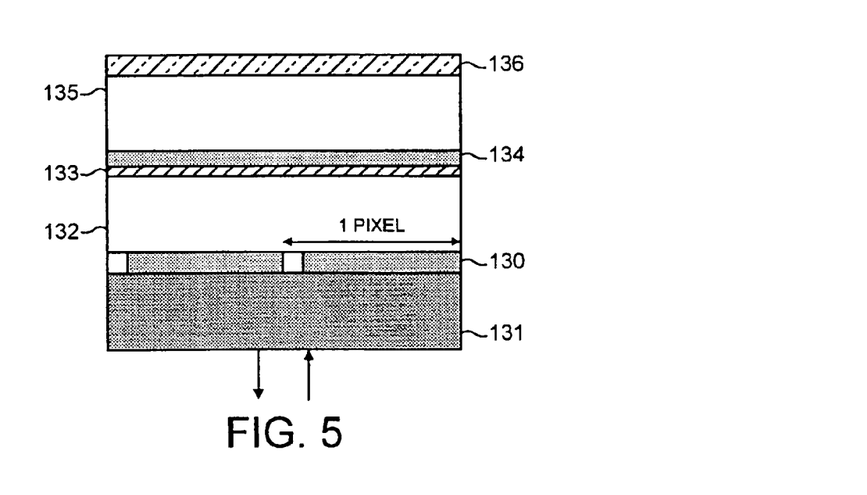
FIG. 5 shows a schematic cross-sectional view of a second embodiment of a SLM with integral quarter-wave plate.

A second embodiment is shown in FIG. 5.

Referring to FIG. 5, a pixel array 130 is integrated on a silicon-1.5 μm-transparent backplane structure 131, and is sandwiched between the backplane structure and one face of a liquid crystal layer 132. The other side of the liquid crystal layer 132 is in contact with an alignment layer 133, which in turn is covered by an ITO layer 134. A quarter wave-plate 135 is disposed between a front aluminium mirror 136 and the ITO electrode 134. The thickness of the quarter wave plate may be adjusted by spin-coating techniques so that in reflection it functions as a half-wave plate at λ=1.57 μm.

Figure 6:
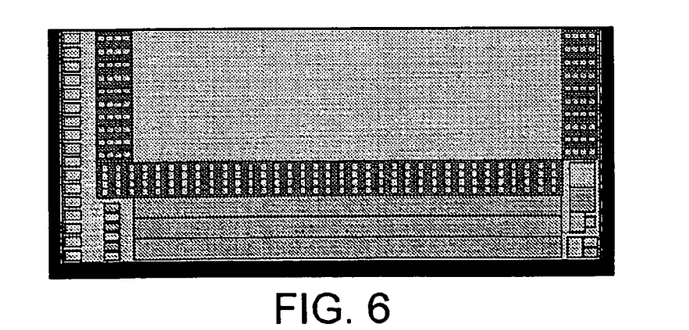
FIG. 6 shows an overview of an exemplary silicon back plate layout for the device of FIG. 5.

An embodiment of a spatial light modulator in accordance with FIG. 5 was constructed. The pixels were constructed using the polysilicon layer of a conventional 2 μm CMOS process. FIG. 6 shows an overview of the silicon backplane layout.

Figure 7:
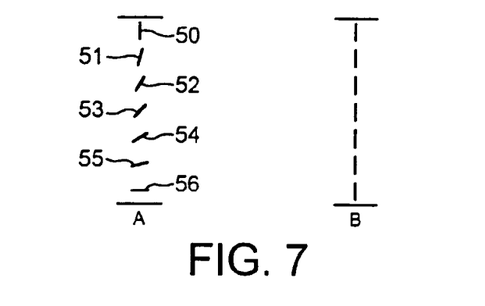
FIG. 7 shows a schematic diagram of a pi cell for use in the invention.

Referring to FIG. 7 a further embodiment of the invention uses a twisted nematic liquid crystal mixture in a π-cell configuration, again using a quarter-wave plate. Such a device enables reduced liquid crystal response time. In such cells the director of the nematic liquid crystal twists along the thickness of the cell through an angle. FIG. 7A shows the director angle as a series of illustrative lines 50–56 across the cell thickness, with the cell in the unbiased state. FIG. 7B shows the other extreme condition with maximum bias, with the directors forming a straight line between the front and rear plates. In a pi cell flow of material within the cell during the switching process is minimised and the response time decreases. Given that the thickness of the cell is large enough so that the field can be actually wave-guided through it, the same principle of FIG. 2 applies and the cell can give fast, polarisation insensitive switching.

Although the above discussions are in the context of an integral retarder, it is also possible to use a non-integral retarder, such as a non-integral quarter wave plate. The following description is not therefore limited to an integral quarter wave plate.

Figure 8:
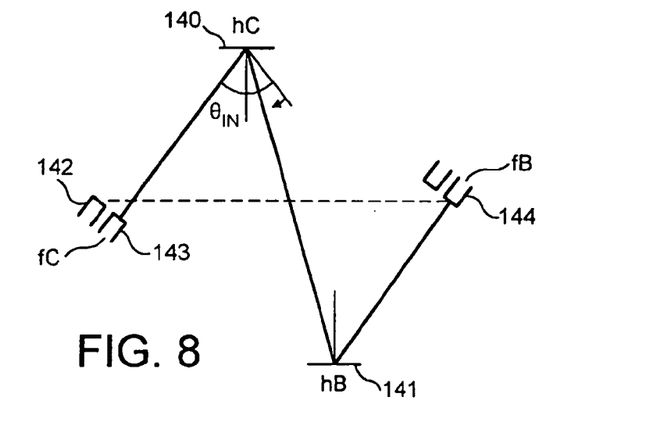
FIG. 8 shows a partial layout diagram of a first embodiment of an optical switch using two reflective SLMs, in accordance with the invention.

Referring now to FIG. 8, a first partial diagram of an embodiment of a reflective switch uses a first, or input SLM 140 and a second, or output SLM 141, each divided into a set of blocks (or holograms), and disposed spaced apart and generally parallel to and on opposite sides of an axis of symmetry 142. The two SLMs face the axis 142, and are spaced along it. An input fibre array 143 having an input fibre FC is directed towards the first SLM 140, and is disposed such that light from the fibres in the array are incident upon the input SLM at an angle $\theta_{in}$ to a plane normal to the plane of the SLM. An output fibre array 144 having an output fibre fB is similarly directed with respect to the output SLM 141. Thus light describes a generally zigzag path from the input fibres of the input array, to the first SLM 140, then to the second opposing output SLM 141 and finally to a fibre of the output array 144. As discussed above, each SLM displays plural holograms, and the disposition of the system is such that for the input SLM 140, each hologram is associated with a particular input fibre, while for the output SLM 141, each hologram is associated with a particular output fibre.

Routing from input fibre fC to output fibre fB is achieved by configuring input hologram hC to deflect the input beam to output hologram hB, so that the angle of reflection typically differs from the incident angle $\theta_{in}$. Output hologram hB deflects the beam incident on it to output fibre fB. In between each hologram and its corresponding fibre there is an optical system, embodiments of which are described later herein, that has the function of presenting beams of appropriate diameter to the hologram.

Figure 9:
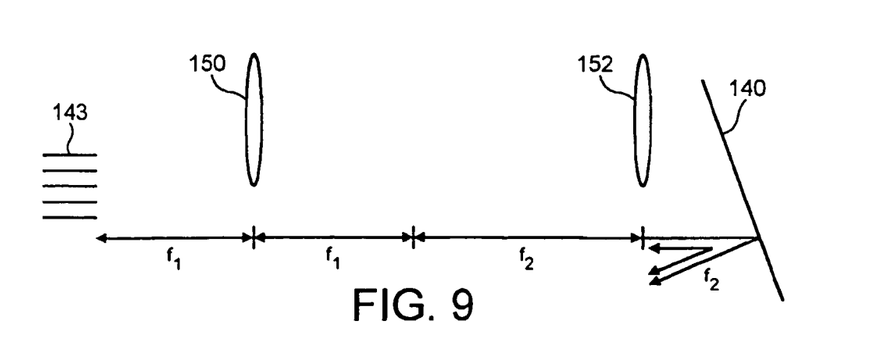
FIG. 9 shows a schematic diagram of a part of a first optical system useable in the switch of FIG. 8.

In order to minimise the system losses, it is desirable to have as few lenses as possible in the optical system. A first optical system, for use with the switch of FIG. 9, is shown in FIG. 9. Referring to FIG. 9, the optical system has a first 150 and a second 151 confocal lens in a telescopic arrangement. The system has the fibre array 143 to the left, as shown, of the first lens 150, and the SLM 140 on the right of the second lens 151. The focal length $f_1$ of the first lens 150 is shorter than the focal length $f_2$ of the second lens 151. The fibre array 143 is positioned at the input focal plane of the first lens 150, while the output focal plane of the second lens 151 is approximately midway between the hologram devices 140, 141 (see FIG. 8). The same system would be used at both input and output to the switch. Under certain circumstances, as will be clear to those skilled in art, a field flattening lens may be required.

In a co pending patent application an embodiment using reflective SLMs has the beam passing twice through a lens (off-axis) positioned immediately in front of the SLM.

Figure 10:
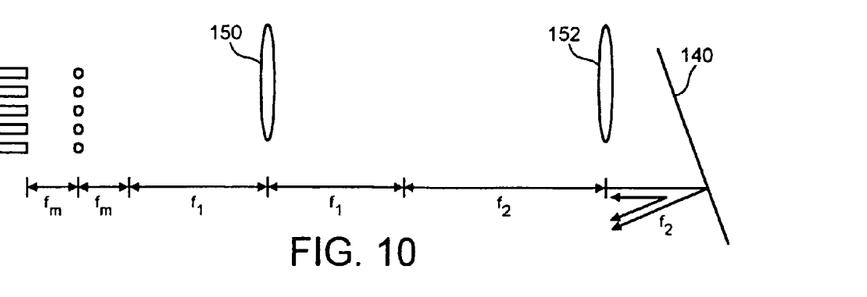
FIG. 10 shows a schematic diagram of a part of a second optical system including a microlens array, useable in the switch of FIG. 8.

The system of FIG. 9 has a relatively low wavelength range. However, a number of measures can be used to improve the wavelength range. These include:

use of fibres with a larger spot-size, such as TEC (Thermally Expanded Core) fibres:
  use of fibres with a narrower diameter thus allowing closer packing; and
  use of a microlens array after the fibre array, so that the focused spots leaving the microlens array are in the input focal plane of the lens of lower focal length (see FIG. 10 in which a microlens array 153 having focal length $f_m$ is between the lens 150 and the input fibre array 143. The input microlens array 153 is disposed with respect to the input fibres so as to focus light from those fibres to the focal plane of the lens 150).

An advantageous option is to use both a microlens array and larger spot-size fibres in the fibre array.

As will be clear to those skilled in the art, the required number of pixels in each row of the hologram, M, may be calculated using the beam spot size of the hologram and the maximum beam steering angle, and the cross talk requirement.

The requirements of optimum performance suggest the use of either standard fibres with a microlens array or fibres with larger than standard spot size.

As known to those skilled in the art, a quarter-wave plate will only work perfectly for one particular wavelength, giving rise to errors at other wavelengths. Deviations from the theoretical also result from fabrication tolerances in the quarter-wave plate thickness and birefringence, and from misalignments between the plate orientation and the plane of tilt of the liquid crystal.

It can be shown that these effects produce zero-order (i.e. undiffracted) polarisation-dependent crosstalk in a switch configuration due to the component of incident light in the y polarisation direction.

For incident light polarised in the x direction, it can be shown that the result of the errors is to produce a diffraction order at twice the angle of the intended main diffraction order. The amplitude of this doubled-order crosstalk varies with the polarisation state of the input light, and hence the effect is to generate polarisation-dependent crosstalk.

Reference to FIG. 8 shows that the input and output holograms deflect the beam in opposite directions. As known, maximal wavelength range is achieved when angular deflection is equal and opposite. The consequence is that, with the SLMs parallel as shown, the beams travelling from the input fibres to the input holograms are parallel to the beams travelling from the output holograms to the output fibres.

As the hologram array is regular, such that the set of tilt angles is quantised into units of Mp/L, where M is the number of pixels in each row of the hologram, p is the pixel pitch, and L is the distance between the holograms, therefore to route to a fibre $n_x$ long in the x direction, and $n_Y$ along in the y direction, the beam deflection at the input hologram is given by equation 8:

$$\delta(\sin\theta_X) = \frac{n_X Mp}{L} \text{ and } \delta(\sin\theta_Y) = \frac{n_Y Mp}{L} \quad (8)$$

Also the beam deflection at the output hologram is (equation 9):

$$\delta(\sin\theta_X) = -\frac{n_X Mp}{L} \text{ and } \delta(\sin\theta_Y) = -\frac{n_Y Mp}{L} \quad (9)$$

Figure 11:
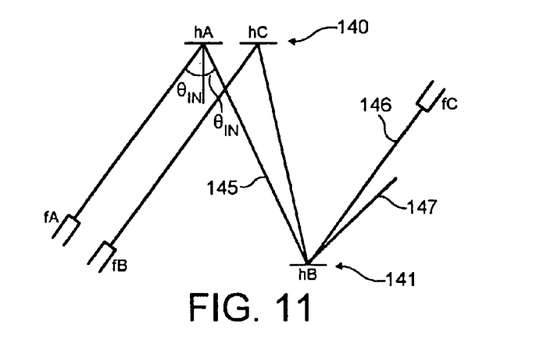
FIG. 11 shows the effects of zero-order cross talk in the device of FIG. 8.

Referring now to FIG. 11, the output SLM 141 is arranged such that the zero-order beam reflected from the centre of any hologram on the input SLM 140 is incident on the centre of an output hologram of the output SLM 141. This is the configuration that maximises the wavelength range. For example, the zero-order reflection from hologram hA is incident on the centre of hologram hB.

The effect of the quarter-wave plate tolerances is to route a beam 145 of amplitude $a_{YY}$ from hologram hA on input SLM 140 to hologram hB on output SLM 141, where $a_{YY}$ is the fraction of incident light polarised in the y direction which remains in that state after transition through the first SLM 140. Analogous effects at the second SLM 141 cause a beam 146 of net amplitude of up to $(a_{YY})^2$ to pass into the zero-order output from hologram hB. As a result of the system geometry, the zero-order beam 146 reaches output fibre fC. Hence the effect of the y polarised light that remains in this polarisation state is to cause crosstalk in fibre fC of maximum amplitude $(a_{YY})^2$ from the signal entering the switch at fibre fA. The remainder of the light from hologram hA directed to hologram hB has amplitude $a_{YY}(1-a_{YY})$. This light will be subject to the intended deflection angle introduced by hologram hB, and will form a light beam 147. Let the distance in hologram units between holograms hA and hC on first, input SLM 140 be $(d_X, d_Y)$. What happens next depends on the design of the system. For the basic system (microlens-free system), the beam will enter output fibre fC at a tilt angle. The system may be designed such that this light (of maximum amplitude $a_{YY}(1-a_{YY})$) is partially attenuated by the limited angular acceptance of the output fibre (or offset acceptance, depending on the optical architecture). It may be shown that the attenuation, $\alpha_{TILT}$, due to this tilt is given by equation 10:

$$\alpha_{TILT}=(d_X^2+d_Y^2)\alpha_T \quad (10)$$

where $$\alpha_T = -\frac{5C^2 \log_{10} e}{1-\left(\frac{C\omega}{s}\right)^2}$$

where C is the clipping parameter at the hologram, such that $Mp=C.\omega_{HOL}$, where $\omega_{HOL}$ is the beam spot-size at the hologram. With a switch configured for maximum wavelength range, the worst-case value of $d_X^2+d_Y^2$ is unity. To improve crosstalk suppression, $\alpha_{TILT}$ should be as high as possible: thus performance is improved by increasing the value of the ratio of the spot-size to the fibre separation.

Figure 12:
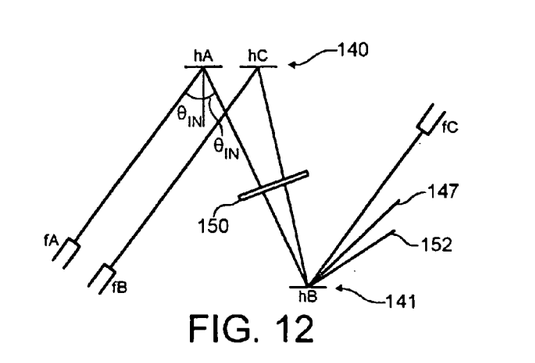
FIG. 12 shows a partial layout diagram of a second embodiment of an optical switch in accordance with the invention, being a modification of FIG. 8 to include a half wave plate in the optical path between the two SLMs.

Referring to FIG. 12, a second embodiment of an optical switch differs from that shown in FIG. 8 by disposing a half-wave plate 150 between the two spatial light modulators 140, 141. The half=wave plate exchanges for a second time the x and y polarisation components so that the residual zero order beam 151(of maximum amplitude $a_{YY}$) from the first SLM 140 is x polarised on reaching the second SLM 141. Of this light a first output beam 152 results from a fraction $a_{XX}$ being deflected by twice the intended deflection angle, and there is thus no longer crosstalk directed precisely at output fibre fC. In fact this beam is deflected so it comes in at twice the tilt (or twice the offset, depending on the architecture), and the attenuation is scaled up by a factor of 4. The rest of this polarisation-dependent zero-order light is again deflected by the intended deflection angle, and is subject to the same attenuation as for the system without a central half-wave plate.

Figure 13:
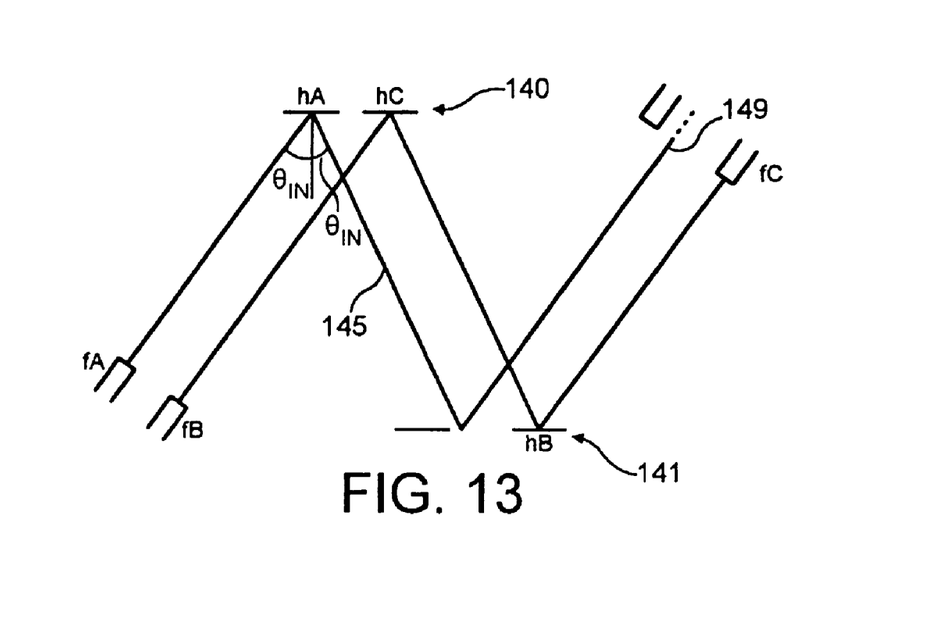
FIG. 13 shows a partial layout diagram of a third embodiment of an optical switch in accordance with the invention, being a modification of FIG. 8 having the output SLM offset laterally to reduce cross talk.

Referring to FIG. 13, a third embodiment of an optical switch according to the invention has the second SLM 141 offset by half a hologram's width in one plane (e.g. the x direction). Thus zero-order crosstalk 145, including the polarisation-dependent zero order, is directed at a point midway 149 between output fibres. In this case the zero-order crosstalk is subject to an offset of s/2, with a corresponding additional attenuation dependent on the offset.

The third embodiment is most appropriate in the presence of good surface flatness on the SLM. For the case of offset loss, it reduces as the ratio of the spot-size to the fibre separation is increased. In any final design there will be an optimum value of this ratio to obtain the overall required system performance.

Figure 14:
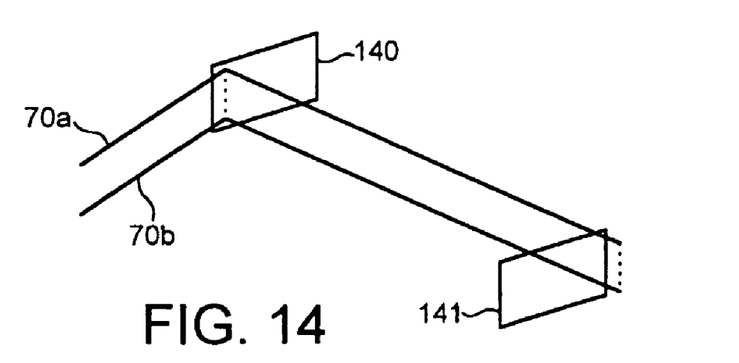
FIG. 14 shows a fourth embodiment in which the output SLM is offset transversally to avoid cross talk.

Referring now to FIG. 14, in a further embodiment a further reduction of the zero order is achieved by offsetting the output SLM 141 with respect to the input SLM 140 by a whole SLM's height (or more) in the direction normal to the plane of incidence. The figure shows two light beams 70a, 70b, each incident on a first SLM 140, and having a zero-order reflection from that SLM to define a respective plane of incidence. It can be seen that each plane of incidence is horizontal—the x–z plane. The output SLM 141 is offset downwardly so that zero orders do not impinge on it. Alternatively, an upward shift could be employed. This embodiment offers resilience to the effects of bowing or long-range surface distortion of the reflective surface inside the SLM. In this case the zero orders fall outside of the output fibre array, and can be conveniently used for monitoring purposes, for example.

Now consider the polarisation-dependent doubled orders, in a 2-D system. Let these be approaching the output hologram at deflection angles (equation 11):

$$\delta(\sin\theta_X) = \frac{c_X Mp}{L} \text{ and } \delta(\sin\theta_Y) = \frac{c_Y Mp}{L} \quad (11)$$

In the zero-order aligned system (FIG. 8) the possible values of $c_X$ and $c_Y$ are always even, while $n_X$ and $n_Y$ can take any integer values. Hence it is possible for doubled orders from the input SLM 140 to arrive at the centres of output holograms, and afterwards be focused directly, or at a tilt, into an output fibre. In the zero-order interleaved system (FIG. 10), however, the possible values of $c_X$ are always odd integers, while $n_X$ can only take half-integer values. Hence the doubled orders from the input SLM 140 will arrive between the output holograms, and will be focused directly, or at a tilt, into points midway between output fibres. Hence zero-order interleaving also creates doubled-order interleaving.

In a preferred embodiment, the attenuation of beams arriving between the output fibres is increased by adding black paint to the glue holding the fibres together inside the fibre array. It will be understood that other absorbers could also be used. In another embodiment, the spacing between the fibres of the array is occupied by interstitial fibres which serve to accept and guide away cross talk from the switching zone.

The amplitude of the doubled-order beam is at most $a_{XX}$. In the absence of a central half-wave plate, there will be a beam of maximum amplitude $a_{XX}^2$ coming out at deflection angles (with reference to beams focused directly into an output fibre) given by equation 12:

$$\delta(\sin\theta_X) = \frac{(c_X - 2n_X)Mp}{L} \text{ and } \delta(\sin\theta_Y) = \frac{(c_Y - 2n_Y)Mp}{L} \quad (12)$$

The worst-case scenario is that $c_X=2n_X$, and $c_Y=2n_Y$. In this case for the zero-order aligned system (FIG. 11), the beam of maximum amplitude $a_{XX}^2$ will be focused directly down the output fibre. While for the zero-order interleaved system (FIG. 13), this beam will be focused in between the output fibres, and will therefore be subject to an offset loss.

In the presence of a central half-wave plate, a weak beam, of maximum amplitude $a_{XX}a_{YY}$, will be reflected as a zero-order reflection, and will therefore come out at deflection angles given by equation 13:

$$\delta(\sin\theta_X) = \frac{c_X Mp}{L} \text{ and } \delta(\sin\theta_Y) = \frac{c_Y Mp}{L} \quad (13)$$

Firstly consider what happens in the zero-order aligned system (FIG. 11): this beam is attenuated at the output fibre due to the limited angular acceptance. Either $c_X$ or $c_Y$ could be zero, in which case the minimum value of the tilt loss at the output fibre is 4 $\alpha_T$.

Now consider what happens in the zero-order interleaved system (FIG. 13). The worst-case is $c_Y=0$ and $c_X=1$: the beam will be attenuated by a tilt loss of $\alpha_T$ and also the above described offset loss. In addition, if the output SLM is offset vertically, then the minimum value of $n_Y$ is 1, in which case the beam will additionally be attenuated by a tilt loss of 4 $\alpha_T$.

Now consider the remaining light in the incident doubled order. Without a central half-wave plate, this beam will have a maximum amplitude of $a_{XX}(1-a_{XX})$, while in the presence of a central half-wave plate, this beam will have a maximum amplitude of $a_{XX}(1-a_{YY})$. With or without the central half-wave plate, this beam is deflected by the intended deflection angle, and so leaves the output hologram at a deflection angle given by equation 14:

$$\delta(\sin\theta_X) = \frac{(c_X - n_X)Mp}{L} \text{ and } \delta(\sin\theta_Y) = \frac{(c_Y - n_Y)Mp}{L} \quad (14)$$

For the zero-order aligned system, the worst-case is for either $c_X=n_X$ or $c_Y=n_Y$, but not both. Assume that one of these is true. The minimum attenuation is when $|c_X-n_X|=1$ or when $|c_Y-n_Y|=1$ and so the beam will be attenuated by a tilt loss of $\alpha_T$. For the zero-order interleaved system, the minimum attenuation is when $|c_X-n_X|=\frac{1}{2}$ and $|c_Y-n_Y|=0$. The minimum attenuation is then $0.25\alpha_T$, added to the offset loss. If additionally, the output SLM 141 is offset by an odd integer number of hologram heights, then the offset loss is doubled from that previously defined, and the minimum value of $|c_Y-n_Y|$ becomes $\frac{1}{2}$, so the tilt attenuation is increased to 0.5 $\alpha_T$.

To maintain desired back reflection conditions off-normal incidence is preferable: it is likely to occur in any event due to the geometrical constraints of the system. However the closer to normal incidence, the better is the performance.

Where the beam has off-normal incidence, the phase of the reflection coefficient from the mirror of the SLM becomes polarisation-dependent, due to plasmon resonances in the metal mirror. The effect is to increase the fraction of light in each polarisation state that remains in that state after passing back through the quarter-wave plate. Another effect of off-normal incidence through the quarter-wave plate is to change, for the worse, both the effective thickness and also the birefringence. Hence a consequence of off-normal incidence is to increase the strength of the polarisation-dependent crosstalk into the zero and doubled orders.

Given off-normal incidence, it now becomes necessary to choose the plane of incidence. In this section the effects of off-normal incidence, but still in the x–z plane, are investigated.

Assume the Poynting vector of the incident light to be in the xOz plane, with a polarisation component $E_{0Y}(t)$ exp j $\epsilon_Y(t)$ in the y direction, and $E_{0XZ}(t)$ exp j $\epsilon_{xz}(t)$ in the xOz plane (in a direction mutually orthogonal to y and the Poynting vector).

Figure 15:
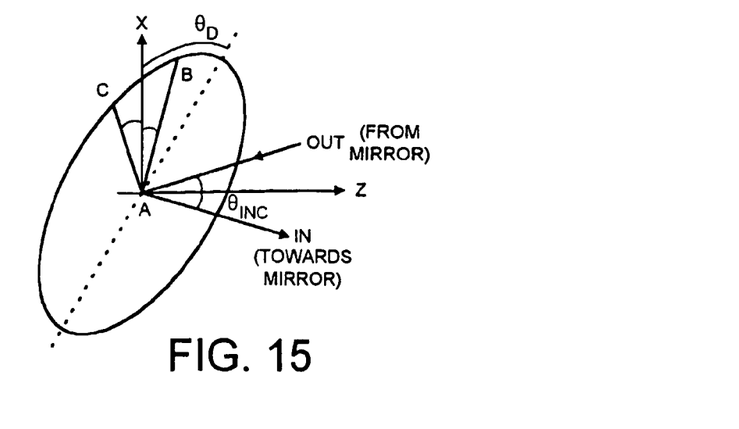
FIG. 15 shows propagation conditions inside the liquid crystal.

Let the light be incident at an angle $\theta_{INC}$ to the mirror, as shown in FIG. 15, and let the long axis of the index ellipsoid be in the xOz plane, at an angle $\theta_D$ to the x-axis. A geometric method as discussed previously may be used to analyse the propagation. As before, the index ellipse is defined by the intersection of the plane perpendicular to the Poynting vector with the index ellipsoid. As long as the Poynting vector remains in the xOz plane, the light component polarised in the y direction and travelling towards the mirror ($E_{0Y}(t)$ exp j $\epsilon_Y(t)$) experiences a refractive index $n_0$, that is independent of the tilt angle. This means that even if the tilt angle is changing in the z direction, the y polarised component still perceives a constant refractive index. This index is also independent of the angle of incidence. The index experienced by the orthogonal component ($E_{0XZ}(t)$ exp j $\epsilon_{xz}(t)$) is the length of the major axis of this ellipse. On propagation towards the mirror the major axis is at an angle $\theta_D - \theta_{INC}$ to the director in the x0z plane: the length and direction of this axis is shown by the line AB on the figure. Mathematically the index experienced by the orthogonal component ($E_{0XZ}(t)$ exp j $\epsilon_{xZ}(t)$) is given by substituting $\theta = \theta_D - \theta_{INC}$ into equation (1). After reflection from the mirror and passing back through the quarter wave plate it is the component $E_{0Y}(t)$ exp j $\epsilon_Y(t)$ that is polarised in the x0z plane. For this second pass, the major axis of the index ellipse is now at an angle $\theta_D \theta_{INC}$ to the director in the x0z plane: the length and direction of this axis is shown by the line AC on the figure. Mathematically the index experienced by the orthogonal component ($E_{0XZ}(t)$ exp j $\epsilon_{xZ}(t)$) is given by substituting $\theta = \theta_D + \theta_{INC}$ into equation (1). Hence the phase delays for the two components are now given by equations 15 and 16:

$E_{OXZ}$ component:

$$\Delta \phi_{OXZ} = \Delta \phi_{1ST-PASS} + \Delta \phi_{2ND-PASS} = kn(\theta_D - \theta_{INC})d + kn_0 d \quad (15)$$

$E_{OY}$ component:

$$\Delta \phi_{OY} = \Delta \phi_{1ST-PASS} + \Delta \phi_{2ND-PASS} = kn_0 d + kn(\theta_D + \theta_{INC})d \quad (16)$$

Therefore the phase-modulation now has a weak polarisation dependence, which increases with the angle of incidence, and is given approximately (to second order) by equation 17:

$$\Delta \phi_{0Y} - \Delta \phi_{0XZ} = 2k\theta_{INC} \frac{\partial n}{\partial \theta}\bigg|_{\theta_D} \quad (17)$$

In a cell in which the tilt angle is varying (as in 7), the polarisation dependence of the phase modulation is given by equation 18:

$$\Delta \phi_{0Y} - \Delta \phi_{0XZ} = \frac{2k\theta_{INC}}{d} \int_{z=0}^{d} \frac{\partial n(\theta(z))}{\partial \theta}\bigg|_{\theta} dz \quad (18)$$

The rate of change of n with respect to director angle is easily shown to be (equation 19):

$$\frac{\partial n}{\partial \theta} = \frac{n^3(\theta)}{2} \sin 2\theta \left( \frac{1}{n_0^2} - \frac{1}{n_e^2} \right) \quad (19)$$

Note that for tilt angles in the range 0 to $\pi/2$, this derivative is always negative, while for tilt angles in the range $\pi/2$ to $\pi$, the derivative is always positive. For a pi cell, the tilt angle $\theta$ varies between 0 and $\pi$. Hence the polarisation-dependent phase modulations may partially cancel.

An important property of this plane of incidence, is that of the directions of the two polarisation modes. Bearing in mind that these are given by the directions of the minor and major axes of the ellipse formed by the intersection of the plane perpendicular to the Poynting vector, with the index ellipsoid, if the Poynting vector is in the x0z plane, then the minor axis is always in the y direction and the major axis is always in the x0z plane (and parallel of course to the x0z component of the incident light). Therefore the polarisation states of the y polarised and orthogonal components of the incident light are not changed inside the liquid crystal, and therefore proper polarisation component exchange should still take place at the quarter-wave plate and mirror.

Returning now to the polarisation-dependence, the effect on a beam-steering device, is to introduce a polarisation-dependence into the amplitude (but not the output angle) of each diffraction order, where this polarisation-dependence is a function of the angle of incidence. Now consider an N×N switch using two such devices, and let the SLM shown in FIG. 15 be the input SLM. In order to keep the mathematics simple, an analysis is now presented for 1-D SLMs, and hence 1-dimensional beam-steering. The results of this analysis hold good for two dimensional SLMs. Define Fourier coefficients $a_{L1}$ and $b_{L1}$ such that (equations 20 & 21):

$$a_{LI} = \int_{u=-\infty}^{\infty} \exp i \left\{ kn_0 d + \phi(u) - kd\theta_{INC} \frac{\partial n}{\partial \theta_D}\bigg|_{\theta_D(u)} \right\} \exp - i \left( \frac{2\pi Lu}{\Omega} \right) du \quad (20)$$

$$b_{LI} = \int_{u=-\infty}^{\infty} \exp i \left\{ kn_0 d + \phi(u) + kd\theta_{INC} \frac{\partial n}{\partial \theta_D}\bigg|_{\theta_D(u)} \right\} \exp - i \left( \frac{2\pi Lu}{\Omega} \right) du \quad (21)$$

where u is the position co-ordinate of each pixel, and $\phi(u)$ is the intended phase modulation, as defined immediately before equation (13). Hence for the input SLM, the y polarised component of the incident field is diffracted into orders of amplitude $b_{L1}$, while the orthogonal component is diffracted into orders of amplitude $a_{L1}$. For a well-designed hologram, almost all of the power will go into a single diffraction order.

Figure 16:
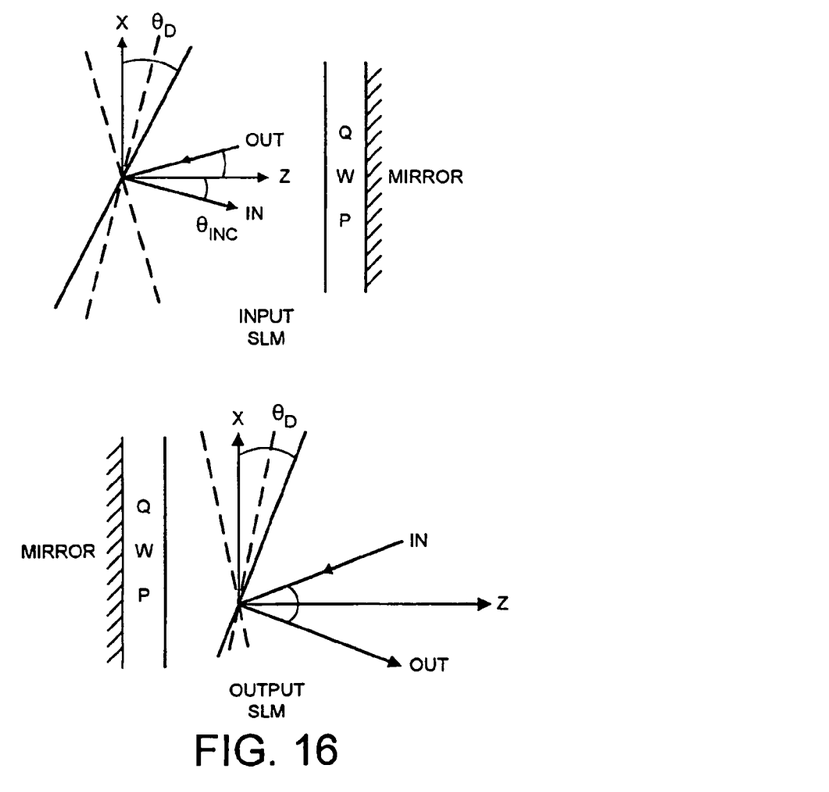
FIG. 16 shows the differing propagation conditions inside the input and output SLMs.

It is assumed that the input and output SLMs are made in the same way. Now consider pixels in the two SLMs applying the same nominal phase modulation (for a normally incident beam), and hence having the same tilt angle, $\theta_D$. Due to the geometry of the arrangement of SLMs etc, the beam entering the 1st SLM is parallel to the beam leaving the second SLM, as shown in FIG. 16. Let there again be a half-wave plate between the two SLMs.

The y polarised component of the field incident on the 1st SLM, is polarised in the x0z plane on leaving the 1st SLM, and due to the half-wave plate is again y polarised on entering the second SLM. This component perceives the ordinary index $n_0$ on propagation towards the mirror. On propagation away from the mirror, the index perceived is given by an effective tilt angle of $\theta = \theta_D - \theta_{INC}$. Hence the total phase delay for this component is given by (equation 22):

$E_{OY}$ component:

$$\Delta \phi_{OY} = \Delta \phi_{1ST-PASS} + \Delta \phi_{2ND-PASS} kn(\theta_D - \theta_{INC})d + kn_0 d \quad (22)$$

Similarly, it can be shown that for the orthogonal polarised component (in the x0z) plane of the beam incident on the 1st SLM, the phase modulation at the second SLM is given by (equation 23):

$E_{OXZ}$ component:

$$\Delta \phi_{OXZ} = \Delta \phi_{1ST-PASS} + \Delta \phi_{2ND-PASS} = kn_0 d + kn(\theta_D + \theta_{INC})d \quad (23)$$

At the second SLM, and assuming substantially flat SLMs, the hologram is substantially complementary to that at the first SLM. Let the intended phase modulation at the second SLM be $\phi_c(u)$, and let the director angle be $\theta_c(u)$. If at the input SLM, the hologram is designed to maximise the output into the L'th diffraction order, then at the output SLM, the hologram should maximise the output into the −L'th diffraction order. For this output SLM therefore, the Fourier coefficient $b_{-L2}$ that defines the amplitude of the main diffraction order for the y polarised component of the field incident on the 1st SLM is given by (equation 24):

$$b_{-L2} = \int_{u=-\infty}^{\infty} \exp i\left\{ kn_o d + \phi_C(u) - kd\theta_{INC} \frac{\partial n}{\partial \theta_C}\bigg|_{\theta_C(u)} \right\} \exp + i\left(\frac{2\pi Lu}{\Omega}\right) du \quad (24)$$

while the Fourier coefficient for the main diffraction order from the output SLM for the orthogonal component of the field incident on the 1st SLM is given by (equation 25):

$$a_{-L2} = \int_{u=-\infty}^{\infty} \exp i\left\{ kn_o d + \phi_C(u) + kd\theta_{INC} \frac{\partial n}{\partial \theta_C}\bigg|_{\theta_C(u)} \right\} \exp + i\left(\frac{2\pi Lu}{\Omega}\right) du \quad (25)$$

The overall holographic switching efficiency for the y polarised component of the field incident on the 1st SLM is given by (equation 26):

$$\eta_{OY} = |b_{L1}|^2 |b_{-L2}|^2 \quad (26)$$

while the overall holographic switching efficiency for the orthogonal component of the field incident on the 1st SLM is given by (equation 27):

$$\eta_{OXZ} = |a_{L1}|^2 |a_{-L2}|^2 \quad (27)$$

Now consider the hologram patterns, and let the local director angle, $\theta_D(u)$ be expressed in terms of some fundamental repeating pattern, $\theta_1(u)$ (equation 28):

$$\theta_D(u) = \theta_1(u) * \sum_{J=-\infty}^{\infty} \delta(J\Omega - u_0) \quad (28)$$

Given that the intended or mean phase modulation on the 1st SLM, $\phi(u)$, depends on the local director angle (equations 1 and 7), then it must also show periodicity with the same period $\Omega$, as must any derivatives with respect to $\theta_D(U)$ (equation 19). Therefore, taking into account the effects of off-normal incidence as in equations 20, 21 etc, the net phase modulation will still be periodic with the same period. Hence we may define $H^-(u)$ such that (equation 29):

$$\exp i\left\{ kn_o d + \phi(u) - kd\theta_{INC} \frac{\partial n}{\partial \theta_D}\bigg|_{\theta_D(u)} \right\} = H^-(u) * \sum_{J=-\infty}^{\infty} \delta(J\Omega - u_0) \quad (29)$$

where $u_0$ is some (arbitrary) origin. This origin affects the phase, but not the magnitude, of the diffraction orders. The magnitude of $a_{L1}$ may be obtained in terms of H(u) using Fourier series analysis (equation 30):

$$|a_{LI}| = \frac{2}{\Omega}\left| \int_{-\Omega/2}^{\Omega/2} H^-(u) \exp - i\frac{2\pi Lu}{\Omega} du \right| \quad (30)$$

Similarly, let $\theta_c(u)$ be the director angle on the 2nd hologram, and express it in terms of another fundamental repeating pattern, $\theta_2(U)$ (equation 31):

$$\theta_C(u) = \theta_2(u) * \sum_{J=-\infty}^{\infty} \delta(J\Omega - u_1) \quad (31)$$

Therefore, using the same arguments as above, the phase modulation on the second SLM must also be periodic with period $\Omega$, and so we may define $G^-(u)$ such that (equation 32):

$$\exp i\left\{ kn_o d + \phi_C(u) - kd\theta_{INC} \frac{\partial n}{\partial \theta_C}\bigg|_{\theta_C(u)} \right\} = G^-(u) * \sum_{J=-\infty}^{\infty} \delta(J\Omega - u_1) \quad (32)$$

where $u_1$ is another arbitrary origin. Hence we may calculate the magnitude of $b_{-L2}$ (equation 33):

$$|b_{-L2}| = \frac{2}{\Omega}\left| \int_{-\Omega/2}^{\Omega/2} G^-(u) \exp + i\frac{2\pi Lu}{\Omega} du \right| \quad (33)$$

If we let $G^-(u) = H^-(-u)$, and make the substitution $u' = -u$ it is clear that (equation 34):

$$|a_{L1}| = |b_{-L2}| \quad (34)$$

Physically this may be achieved by making the repeating pattern $\theta_2(U)$ on the second SLM equal to $\theta_1(-u)$ on the first SLM. In which case (from equation(1)), $\phi_c(u) = \phi(-u)$ as required. Now consider the other two amplitude coefficients. At the first SLM, define a periodic phase modulation $H^+(u)$, and use the same origin (equation 35)

$$\exp i\left\{ kn_o d + \phi(u) + kd\theta_{INC} \frac{\partial n}{\partial \theta_D}\bigg|_{\theta_D(u)} \right\} = H^+(u) * \sum_{J=-\infty}^{\infty} \delta(J\Omega - u_0) \quad (35)$$

hence we obtain $b_{L1}$ (equation 36):

$$|b_{LI}| = \frac{2}{\Omega}\left| \int_{-\Omega/2}^{\Omega/2} H^+(u) \exp - i\frac{2\pi Lu}{\Omega} du \right| \quad (36)$$

Now, at the second SLM define a periodic phase modulation $G^+(u)$, to obtain $a_{-L2}$ (equation 37, 38):

$$\exp i\left\{ kn_o d + \phi_C(u) + kd\theta_{INC} \frac{\partial n}{\partial \theta_C}\bigg|_{\theta_C(u)} \right\} = G^+(u) * \sum_{J=-\infty}^{\infty} \delta(J\Omega - u_1) \quad (37)$$

$$|a_{-L2}| = \frac{2}{\Omega}\left| \int_{-\Omega/2}^{\Omega/2} G^+(u) \exp + i\frac{2\pi Lu}{\Omega} du \right| \quad (38)$$

Again, as we have already chosen that (equation 39)

$$\theta_2(u) = \theta_1(-u) \quad (39)$$

then, automatically, $\phi_c(u)=\phi(-u)$, in which case $G^+(u)=H^+(-u)$, and therefore (equation 40)

$$|b_{L1}|=a_{-L2}| \tag{40}$$

Combining (36) and (40) we may obtain (equation 41):

$$|a_{L1}||a_{-L2}|=b_{L1}||b_{-L2}| \tag{41}$$

Hence, if the basic periodic patterns on the two SLMs are chosen to satisfy (39), and the angle of incidence is such that the Poynting vector of the light incident on the first SLM, and leaving the second SLM, is in the plane of tilt of the director (in this case the x0z plane), the overall switch efficiencies can become polarisation-independent (equation 42):

$$\eta_{oY}=\eta_{oxz} \tag{42}$$

Note that this analysis neglects the change in beam direction between holograms due to diffraction-induced beam-steering. This may create some polarisation-dependent loss, but it is expected that the configuration described is still the optimum, as it cancels the polarisation-dependence of the system as a whole due to the angle of incidence.

Given that the two orthogonal components perceive different phase modulation at each plane, the holograms must be designed that the worst-case unwanted diffraction orders do not cause unacceptable crosstalk.

There have thus been described devices and systems for optical switching which are polarisation insensitive. Embodiments of the invention as described are capable of high performance in respect of cross talk.

What is claimed is:

1. A routing switch comprising a first and a second integrated multiphase spatial light modulator for spatial phase modulation of unpolarized light of a predetermined wavelength, the integrated spatial light modulators having a substantially planar liquid crystal layer, a layer reflective of said light of said wavelength and a wave-plate layer, the wave-plate layer providing an optical retardance of $(2n+1)\lambda/4$, said liquid crystal layer having two opposed faces and being disposed and configured to provide an out of plane tilt in response to a voltage applied between said faces, and said liquid crystal layer being spaced from the reflective layer by the said wave-plate layer, wherein the integrated spatial light modulators comprise an integrated array of phase modulating elements and voltage application circuitry, the voltage application circuitry for applying desired voltages across the liquid crystal layer whereby the liquid crystal layer has desired values of out of plane tilt; wherein the integrated multiphase spatial light modulators comprise an array of electrodes, each of the electrodes being associated with a respective portion of the liquid crystal layer to define a said phase modulating element, the electrodes being such that application of voltage to each electrode causes the portion of the liquid crystal layer associated with the said electrode to have a specific value of said out-of-plane tilt; and: wherein the voltage application circuitry is adapted to apply voltages to said array of electrodes for varying a deflection angle of light and the second integrated spatial light modulator is disposed with respect to the first integrated spatial light modulator for receiving light from said first integrated spatial light modulator thereby to route said light, the device further comprising:

a first array of optical fibers forming light sources directed to be off-normally incident on the first integrated spatial light modulator and a second array of optical fibers forming light receivers directed to be off-normally incident on the second integrated spatial light modulator for receiving light from the second integrated spatial light modulator; and drive circuitry for forming a respective plurality of switching holograms on each integrated spatial light modulator, each said switching hologram on said first integrated spatial light modulator in use being operative to deflect light incident on said first integrated spatial light modulator to said switching holograms on said second integrated spatial light modulator, and each said switching hologram on said second integrated spatial light modulator in use being operative to deflect said light beams to a respective optical receiver.

2. The routing switch of claim 1, wherein the switching holograms are spaced apart on said first and second integrated spatial light modulators and the first and second integrated spatial light modulators are disposed such that a respective zero-order beam reflected from each switching hologram on said first integrated spatial light modulator is incident on a spacing between two adjacent switching holograms on said second integrated spatial light modulator.

3. The routing switch of claim 1, wherein a half wave plate is disposed between said first and second integrated spatial light modulators.

4. The routing switch of claim 1, wherein the first and second spatial light modulators are mutually offset so no zero-order beams from the first spatial light modulator are incident on the second spatial light modulator.

5. The routing switch of claim 1, wherein the switching holograms are spaced apart on said first and second spatial light modulators, and the first and second spatial light modulators are disposed such that a respective second-order beam from each switching hologram on said first spatial light modulator is incident on a space between two adjacent switching holograms on said second spatial light modulator.

* * * * *